US006646672B2

(12) United States Patent
Feierbach (10) Patent No.: US 6,646,672 B2
(45) Date of Patent: Nov. 11, 2003

(54) POCKET VIDEO CONFERENCE COMPUTER (75) Inventor: Wolfgang Feierbach, Industriestrasse 6, D-63674 Altenstadt/Hessen (DE)

(73) Assignee: Wolfgang Feierbach (DE)

( * ) Notice: Subject to any disclaimer, the term of this patent is extended or adjusted under 35 U.S.C. 154(b) by 0 days.

(21) Appl. No.: 09/992,848

(22) Filed: Nov. 14, 2001

(65) Prior Publication Data

US 2002/0080231 A1 Jun. 27, 2002

(30) Foreign Application Priority Data

Dec. 21, 2000 (DE) .......................... 200 21 842

(51) Int. Cl.[7] ................................. H04N 7/14
(52) U.S. Cl. ................. 348/14.02; 348/14.01; 379/428.01
(58) Field of Search ............... 348/14.01–14.09, 348/14.1, 14.11, 14.12, 14.13; 455/556, 566, 575; 345/173, 169; 379/330, 428.01–428.04; H04N 7/14

(56) References Cited

U.S. PATENT DOCUMENTS

| D216,328 S | 12/1969 | Gujer |
| 4,340,375 A | 7/1982 | Sakaue et al. |
| 4,379,210 A | 4/1983 | Sparber |
| D308,964 S | 7/1990 | Deakins |
| D317,365 S | 6/1991 | Rousseau |
| 5,414,444 A | 5/1995 | Britz |
| 5,491,507 A | 2/1996 | Umezawa et al. |
| D378,686 S | 4/1997 | Proctor et al. |
| 5,646,649 A | 7/1997 | Iwata et al. |

(List continued on next page.)

FOREIGN PATENT DOCUMENTS

| DE | 296 10 265 U 1 | 12/1996 | | |
| EP | 0 731 589 A2 | 3/1996 | | |
| EP | 0750 245 A1 | 12/1996 | | |
| JP | 410225000 A | * 8/1998 | ............. | H02J/7/00 |
| JP | 2000115732 A | * 4/2000 | ............. | H04N/7/14 |
| JP | 02000295667 A | * 10/2000 | ............. | H04Q/7/38 |

OTHER PUBLICATIONS

Wang; Keyboard with Finger . . . Stylus–Actuable keys; Jul. 12, 1990; WO 90/07743.*
"The Promise of Bluetooth," *LAPTOP*, Jan. 2001, pp. 40–46.
"Expos, Conferences and the Deep Blue Sea," www.WBT2.com, pp. 13.
"Wireless DevCon 2000 Buzzes from Start to Finish," www.WBT2.com, pp. 13.
Hill, Jeremy, "Book Reviews," www.WBT2.com, pp. 88–89.
Ohlsen, Hans–Henrik J., "Let's Get Real . . . a call to arms to WAP developers everywhere," www.WBT2.com, pp. 14.

*Primary Examiner*—Melur Ramakrishnaiah
(74) *Attorney, Agent, or Firm*—Knobbe, Martens, Olson & Bear, LLP (57) ABSTRACT A portable, pocketbook-sized computer is provided with the features of a palmtop computer as well as video conferencing ability. A hinged design is provided so that the unit can fold shut. On one side, a computer unit is housed, including a full keyboard and a monitor, while the other side houses a mobile telephone unit, including a numeric keyboard and similarly sized monitor. The spine included a rotating camera. The units communicated so that the monitors can serve as video phone monitors, each showing one of the communicating parties. In a computer mode, both monitors can operate to display text on figures. Recessed character keys and raised operator keys enable rapid operation despite closely spaced keys. A ball-ended pen is provided for this purpose, sized to fall into one of the recesses at a time. Additionally, the pen is provided with wireless communication with the computer unit to silently alert the owner of incoming calls, or to use as a microphone.

19 Claims, 5 Drawing Sheets

U.S. PATENT DOCUMENTS

| | | |
|---|---|---|
| D385,299 S | 10/1997 | Adams |
| 5,719,936 A | 2/1998 | Hillenmayer |
| 5,734,513 A | 3/1998 | Wang et al. |
| 5,752,203 A | 5/1998 | Yamashita |
| 5,835,863 A | 11/1998 | Ikenouchi et al. |
| D402,310 S | 12/1998 | Hendricks |
| 5,859,663 A * | 1/1999 | Simon .................... 348/14.08 |
| 5,898,600 A | 4/1999 | Isashi |
| 5,960,367 A | 9/1999 | Kita |
| 6,025,871 A * | 2/2000 | Kantor et al. ............ 348/14.08 |
| 6,069,648 A * | 5/2000 | Suso et al. ............... 348/14.02 |
| 6,085,112 A | 7/2000 | Kleinschmidt et al. |
| 6,118,979 A | 9/2000 | Powell |
| 6,137,525 A | 10/2000 | Lee et al. |
| 6,144,358 A | 11/2000 | Narayanaswamy et al. |
| 6,177,950 B1 | 1/2001 | Robb |
| 6,259,932 B1 | 7/2001 | Constien |

* cited by examiner

POCKET VIDEO CONFERENCE COMPUTER

REFERENCE TO RELATED APPLICATION

This application claims the foreign priority benefit under 35 U.S.C. §119 to German Utility Model Application No. 200 21 842.5, filed Dec. 21, 2000.

1. Field of the Invention

The invention relates to a palmtop computer having the features and capabilities of video conferencing.

2. Background of the Invention

Today's office computers and smaller notebook computers work mainly with CPU, RAM storage, hard drive storage and exchangeable storage media. Such computers are relatively large, heavy and have a relatively large energy consumption. The current trend is toward smaller computer units.

EP 0 750 245 A1 discloses a small computer with a notebook design. It is operated with a special electronic pen using a sensitive monitor surface for input and output. This monitor is framed with a flat frame and attached to a rectangular base housing. At one edge of the computer housing the flat frame with the monitor is hinged as a lid. The hinge is built like a pipe, and in the hollow space thereof a telescopic video camera is stored, which is pulled out for use. This notebook computer uses a completely different data input procedure from the established data input procedure of other computers, so that the user has to learn a new way of working. The user's hand and the pen that is employed at least partly obscure the view of the monitor. A further disadvantage of this computer design is that the usable area of one monitor has to be divided among input and output. This problem is especially relevant for videoconferences with more than one communication partner.

SUMMARY OF THE INVENTION

The object of the present invention is to provide a small, lightweight and handy communications computer that affords effective usage and ergonomic operating functions.

This object may be achieved by a computer unit which is provided with a monitor and with a integrated keyboard that is small, but with a layout similar to well-known desktop and laptop keyboards, a mobile telephone unit with a second monitor and with a numeric keyboard that serves to dial telephone numbers and also as a numeric keyboard for the computer unit, and a digital video camera with a lens head having limited rotation.

All three components are connected to each others, such as by printed and flexible wiring or by the latest Bluetooth™ techniques. The computer unit and mobile telephone unit each are provided with a monitor and each has its own input device, to allow data input in an ergonomic way.

The two monitors are connected to each other such that the first monitor shows a picture of the built-in video camera, while the second monitor shows the incoming picture. This allows for telephone communication between two partners or as a conference connection with many communication partners.

The outside design of the preferred embodiment uses a housing like a hardcover pocketbook with two hinges, connecting one back side or spine and two wings. The three inside units each have their own metal or plastic housing, for example in the shape and design depicted in the attached drawings. The complete unit is a small size, low weight, low energy consuming communication computer.

A special feature of the design is the lens head of the video camera, which rotates up to 200 degrees, thus making it possible to show not only the face of the user, but also items, letters or drawings placed on the desktop without moving the whole unit.

It is preferable that this computer have at least one processor and as much volatile memory (RAM) as possible, but a smaller amount of permanent storage; this permits a miniaturization of the design and a minimizing of the power consumption. This computer unit needs permanent storage only for the operating system. Application programs and data are imported into the memory as required via the broadband wireless communication connection. After use, this data may be returned to the home or office computer of the user or to a server of any Internet provider, or sent by email to any other address. The RAM is erased when the device is powered down.

One advantage of this device is that each unit has a full-featured keyboard; users are already familiar with the layout from other such keyboards, and so do not need to learn a new method of data input.

The very small computer keyboard preferably has two groups of keys; one group (preferably characters) is recessed from the main computer housing surface and operated, for example, with a 3 mm glass ball fixed to the rear side of a commercial ball pen. The other group (preferably operator and function keys) projects above the main computer housing surface and these keys are spaced widely enough to be operated with one finger. It is also advantageous for left or right handed users in that the user can hold the pen with his preferred hand, while the fingers of the weaker hand operate the operator keys, such as control, alt, shift, tab, enter and option keys.

It also preferable that the mobile telephone unit has a numeric key block that is also recessed and operated with the rear side of the ball pen. This key block is used for dialing telephone numbers as well as being the numeric key block for the computer unit.

Preferably, some special dedicated keys are also provided as main power switches, to operate the video camera, and to control play functions for recording video and audio data.

The cursor control touch pad is preferably operated with the rear end of the ball pen to facilitate exact positioning on the monitor, while the fingers are used to carry out mouse click functions using the keys to the left or right of the touch pad.

The combination or networking of the monitors and/or text input devices is advantageous in distributing key entry operations and in freely selecting one monitor or both monitors for display, which may enhance legibility in some cases. For example, when calculations involving a large amount of numeric entry are carried out, such as the addition of many numbers, the phone-side numeric keypad may be used, and the computer-side monitor may be used to show the process and result. Alternatively, the content of text or Internet pages can be distributed over the two monitors at an enlargement of 200%. Furthermore, one computer task can be displayed on one monitor and a second task can be displayed on the other monitor.

Further features include connecting ports for CD-ROM or DVD drives, hard drives, printers, scanners, professional video and still picture cameras, sensors and other devices. These may be connected via Firewire EEE 1394, USB, or telecom headset connections. These ports are to be seen at the front edges of the unit when it is closed. Advanced Bluetooth™ transmitting techniques may also be integrated.

The computer unit may be connected with the video camera and with the mobile telephone unit most easily and cheaply using flexible printed circuits. However, this internal connection can also be made using Bluetooth™ technology.

The video camera has its processing unit within the upper part of the square camera housing or spine, while the lower part is reserved for the power accumulators. The power accumulators can be charged with a charger unit, which also serves as a stand for the communications computer in its opened configuration. On the stand the communications computer is tilted approximately 10 degrees backward; this position facilitates use as a video telecommunication unit.

When the unit is used to make telephone conferences, it is preferable to provide a traffic light system to regulate communications between the communication partners. Under such a system, the green light indicates "talk," yellow can indicate "stand by to talk" and red for "do not talk."

BRIEF DESCRIPTION OF THE DRAWINGS

These and other aspects of the invention will be readily apparent from the description below and from the appended drawings, which are meant to illustrate and not to limit the invention, and in which.

DETAILED DESCRIPTION OF THE PREFERRED EMBODIMENT

The portable communications computer 1 of the present embodiment is of a portable size; the illustrated embodiment is approximately the size of a personal digital assistant or pocketbook, or in other words, when folded, is approximately the same size as a DIN A5 sheet of paper, and approximately 1–2 inches in thickness. When opened, as described below, it is approximately the size of a DIN A4 sheet of paper and half as thick as when folded. This portable communications computer 1 contains a computer unit 2 with minimum of one microprocessor (not shown in the figures) and an integrated monitor 3, preferably employing LCD/TFT technology and having a diagonal size of approximately 3.5 inches. The computer unit 2 has integrated input devices 4, including a keyboard 5 for data input and a touch pad 6 for manipulating the cursor on the monitor. The touch pad 6 is similar to the touch pads used in laptop computers. In the example shown in FIG. 1, the computer unit is placed on the right side of the communication computer 1; however, it could be placed on the opposite side. The computer unit 2 is accessible when the communications computer 1 is opened and is affixed to one of the two hinged hard covers 7 and 8. In this example, the computer unit 2 is affixed to the right side hard cover 7.

Figure 1:
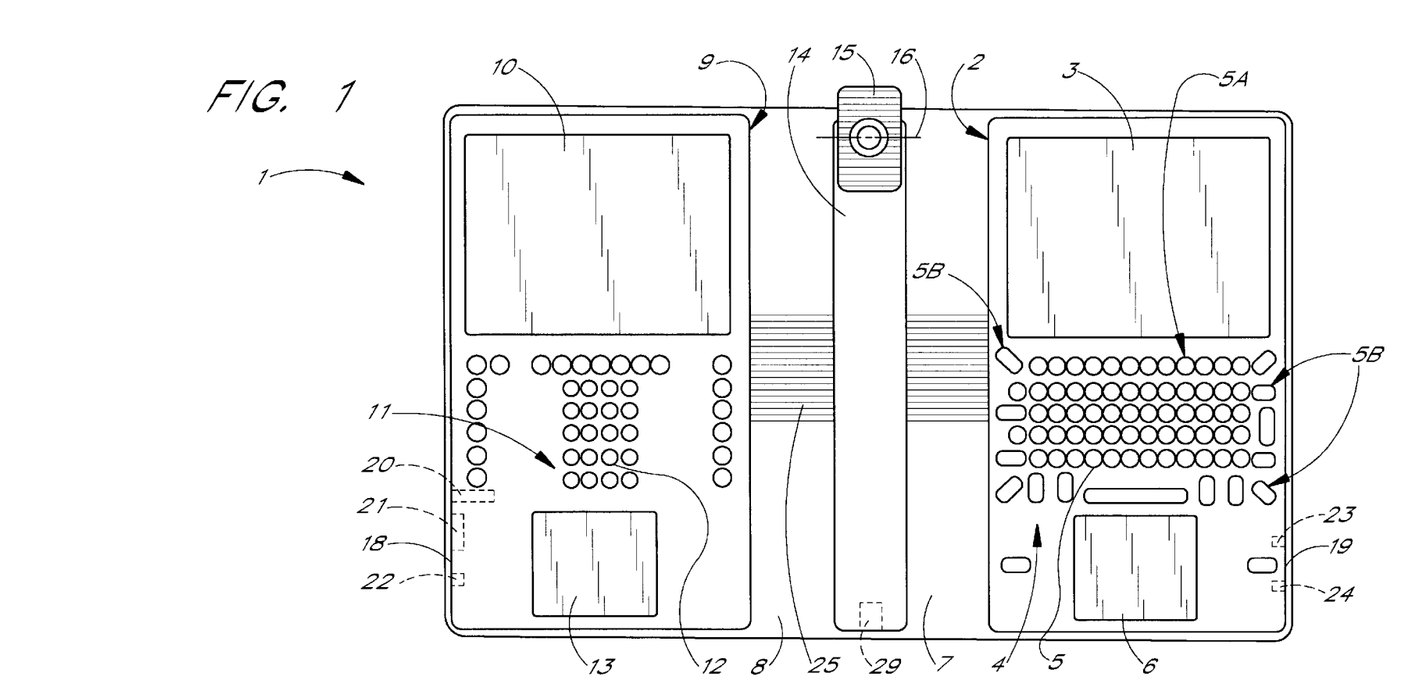
FIG. 1 is a front view of the communications computer in an opened configuration.

In this example, a mobile telephone unit 9 is provided on the left-hand side of the device; the unit 9 includes a monitor 10 and relevant data input devices 11, including a keyboard 12 and a touch pad 13. This mobile telephone unit 9 is affixed to the hard cover 8 on the left side of the device. As mentioned above, the left/right orientation of units 2 and 9 is only an example; computer unit 2 may be placed on the left side, while telephone unit 9 may be placed on the right side. The telephone unit 9 can be used as a video telephone using various technological standards; broadband technology is preferable, and the UMTS standard is particularly preferable.

As can be seen in FIG. 1, the keyboard 5 has the layout of a standard computer keyboard, while the keyboard of the mobile telephone unit 9 has the form of a numerical keypad. Touch pads 6 and 13 work in a similar manner, one controlling the cursor on the computer monitor for all computer operations, the other controlling the cursor on the telephone monitor for controlling and dialing telephone calls and to store data, as well as calculation operations for the computer. The figures do not depict voice recognition systems that can be provided to make the computer unit 2 and the mobile telephone unit 9 operable by voice commands as well.

A digital video and still picture camera 15 is provided at the inner side of the back of the pocketbook structure in between the two pocketbook hard covers 7 and 8 in a central or spine housing 14. The pocketbook hard covers 7 and 8 are hinged to allow opening the entire communications computer to a fully flat position or to any degree a user might find useful for various tasks. Thus, when the device is closed, the camera 15 is protected within the hard covers 7 and 8. The camera 15 is mainly used to produce video or still images, and the camera can also be used as a permanent web cam. The camera head can be rotated vertically through approximately 200 degrees about horizontal axis 16. The camera has a fixed focus lens, but various types of lenses may also be employed and are within the scope of this embodiment. The camera 15 produces an image of the user on the monitor 10 when directed inward. It can thus serve as a mirror, for example a makeup mirror. When directed outward, items, letters or drawings can be shown to the communications partner and placed in the correct light and position.

For video conference connections with 3 or more participants a system similar to a traffic light is integrated. To synchronize the different communication participants, a green light signals "talk," a yellow light signals "stand by to talk" (or "apply to talk"), and a red light signals "do not talk." The yellow light appears whenever the talking partner is silent for longer than an agreed period of time. This may be set, for example, to 2 seconds, and may be altered from time to time. Alternately, the yellow light may be displayed in response to a request to talk, which may be indicated by pressing a key having this function, for example.

In addition to a microprocessor RAM memory, the computer unit 2 also requires storage capacity for essentials such as the operating system, names, dates and also extra capacity for temporary data storage in the device. Many different memory systems may be employed for such non-volatile storage, such as "Memory-Sticks" available from Sony Corp. of Japan or IBM "Mini Discs" available from IBM Corp. of NY, USA or the equivalent. It is preferable that the device be provided with a large amount of RAM in order to accommodate large amounts of data (e.g., applications software or documents), which may be temporarily imported, manipulated, and then returned to a device such as a desktop computer where they are stored. Non-sensitive data can be imported and then sent back to the servers of an Internet service provider. Accordingly, the preferred embodiment contains more volatile memory capacity than non-volatile memory.

Sensitive data can be imported in encrypted form from the home or office computer, manipulated using the communications computer 1, and re-encrypted before being exported to the home or office computer or any other email address. The communications computer 1 preferably has the capability to work with all operating systems and all application programs in accomplishing such tasks, insofar as such systems and programs are compatible with the Internet and communication standards.

The computer unit 2, the mobile telephone unit 9, and the camera 15, or elements thereof, may be networked or connected to each other. In other words, the monitor 10 of the mobile telephone unit 9 can be used, in addition to monitor 3, for computing purposes and in the course of multitasking during work with other programs, such as word processing, graphics, and drawing.

It is also possible to connect both monitors 3 and 10 along one axis to distribute one imported page over the two monitors in the form of a book while enlarging the contents of the page. Both monitors have integrated enlargement factors with various ratios.

The keyboards 5 and 12 and the touch pads 6 and 13 can be connected in the same way as the monitors, completely freely and assigned to the desired device.

Figure 2:
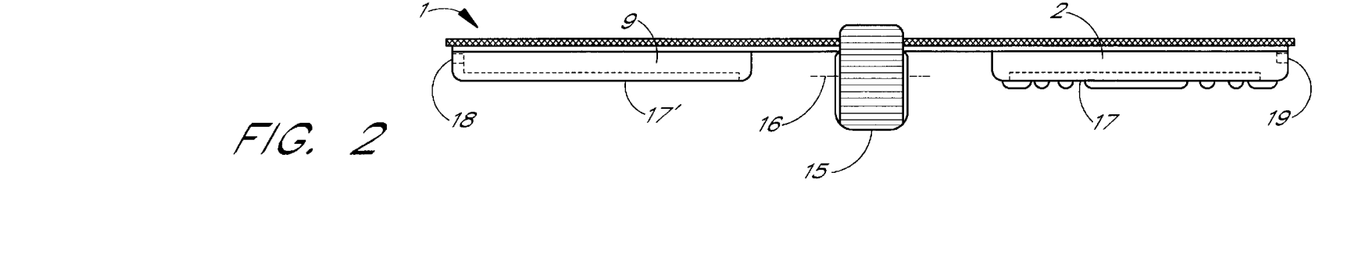
FIG. 2 is a top view of the unit depicted in FIG. 1.
Figure 3:
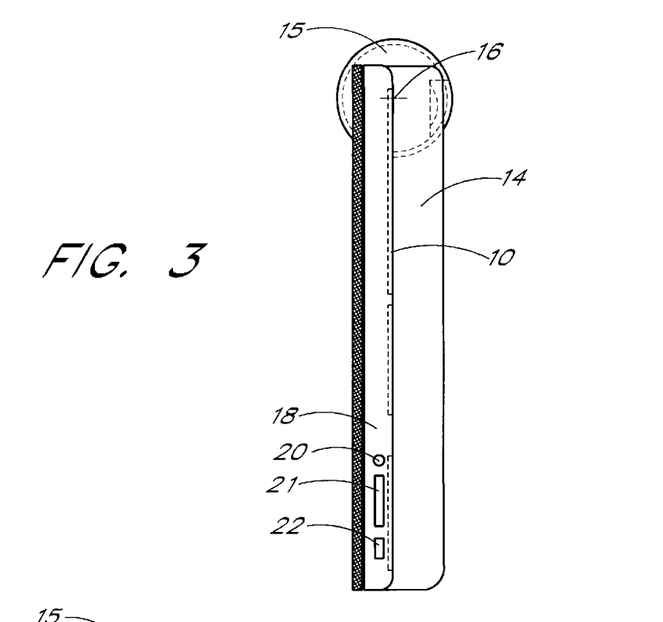
FIG. 3 is a left side view of the unit depicted in FIG. 1.

FIGS. 1 and 2 show that the keyboard 5 (and possibly also keyboard 12) has two different groups of keys 5A and 5B. The first or alphanumeric group of keys 5A, representing characters and function keys, are recessed under the main housing surface 17, while the second or operator group of keys 5B, representing shift, control, alt, caps, return a tab keys, stand out from the housing surface 17, and are spaced more widely from one other than the keys of the first group. The two groups differ in height and spacing to facilitate ergonomic operation. The recessed group of keys 5A of the computer unit 2 and the mobile telephone unit 9 (mostly alphanumeric keys) can be operated by one hand with a 3 mm glass ball 31 that is affixed to the rear end of a commercial ball pen 30 (see FIG. 7) or other stylus. The combination of recessed character keys and a ball-ended pen enables quick operation of closely spaced keys (in a hunt-and-peck manner) with minimal risk of hitting a key accidentally. The group of operator keys 5B can easily be operated with one finger; right-handed users will find it convenient to operate the keys with a left hand finger, while left-handed users will do the opposite. The keys 5B are spaced more widely, and the functions of these keys include alt, tab, shift, control or strg, function, return carriage, enter, option, command (non-character producing), where the functions are repeated on the opposite side to facilitate equal access for right- and left-handed users. In other words, two sets of these operator keys are provided. The two groups of keys 5A and 5B balance the posture of human bodies and are therefore a very good ergonomic solution.

Figure 7:
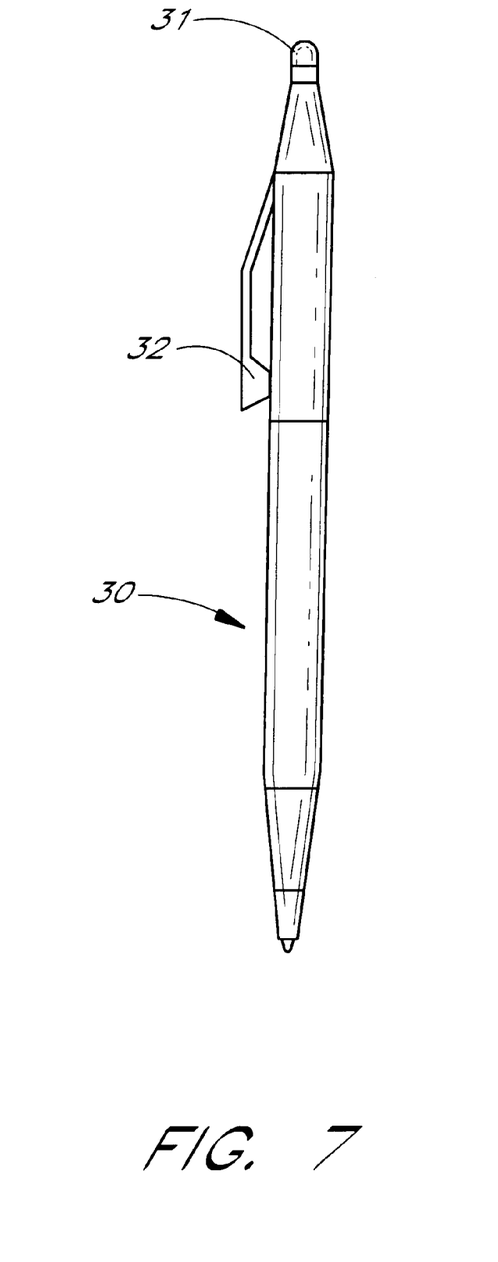
FIG. 7 illustrates a ball pen with a 3 mm glass ball added to the rear end to facilitate the operation of the alphanumeric keys.

Furthermore, referring to FIG. 7, a 3 mm red or green light emitting and flashing diode 31 can be installed at the rear end of the commercial ball pen 30, and this may be used to operate the recessed keys. As such a pen is normally placed in a shirt pocket, collar or suit pocket with a clip 32, such a pen preferably signals an incoming telephone call instead of or in addition to a sound call signal or vibration call signal.

The diode can be energized by small earphone or watch batteries and the signal may be engaged by a short range Bluetooth™ wireless radio contact. Additionally, if a microphone that is wirelessly connected with the portable communication computer were incorporated into the pen, an audio call could be conducted by the user without even opening the computer.

As can be seen in FIG. 1, there are additional keys 12 just under the monitor 10 on the mobile telephone unit 9. These keys can be used to operate video and audio functions, such as recording, play, fast forward, rewind and the like, and some keys can be dedicated to special functions, like starting and operating optional sensor input devices.

Figure 6:
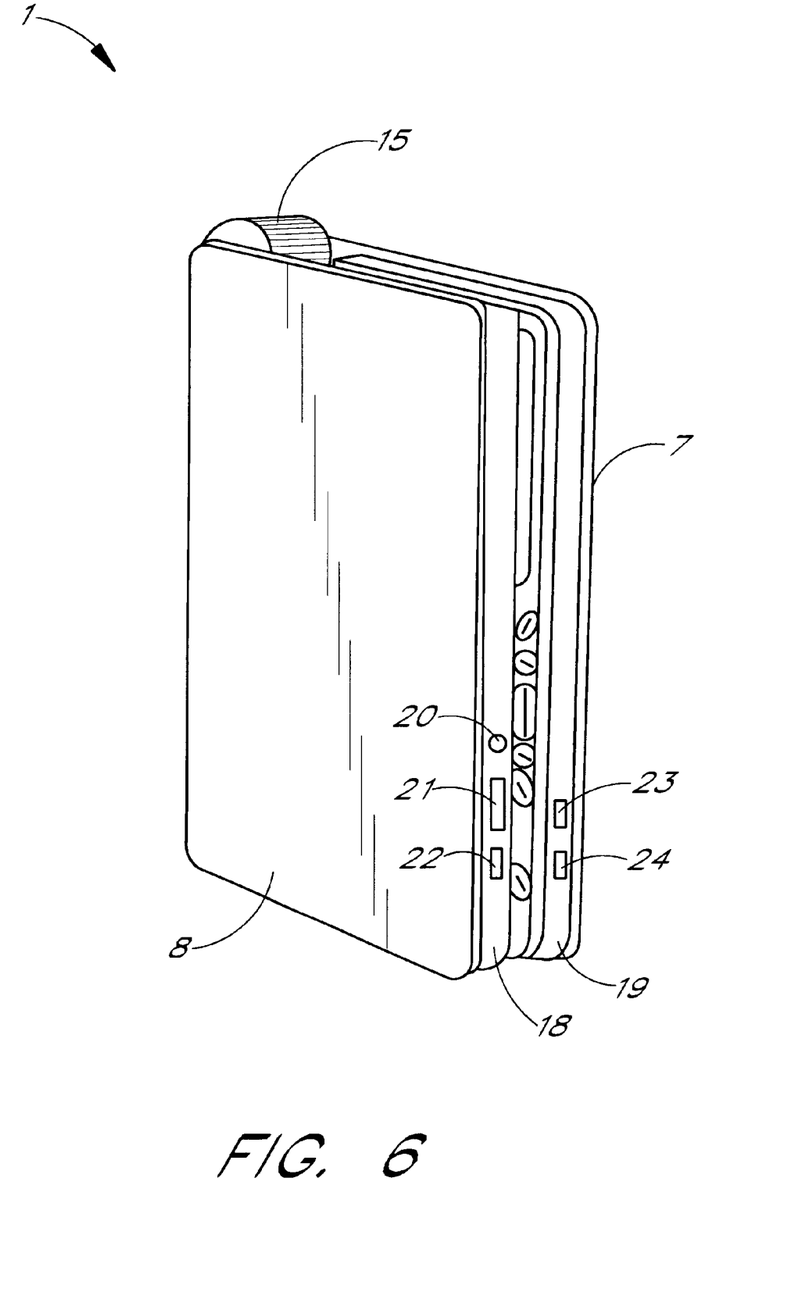
FIG. 6 is a is a right side view of left, top and front perspective view of the communications computer in a closed configuration.

Connections to external devices are possible with the connecting ports seen on the edges 18 and 19 of the device in FIG. 6. These ports 20, 21, 22, 23, and 24 may employ the Firewire, USB, telecom, or other standards. The connections are for CD-ROM drives, DVD drives, external hard disks, printer, sensors, external antennas, telephone or any other required external device. Alternatively, for connections of all types it is also possible to make the connections wireless with Bluetooth™ technology, a short-range radio wave system, or by infrared.

In FIG. 1, the connections between the computer unit 2, the mobile telephone unit 9, and the camera 15 are shown as flexible printed circuits 25. This is the simplest and cheapest way to connect the units.

Figure 5:
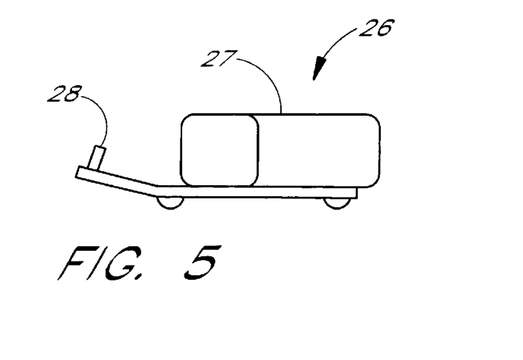
FIG. 5 is a right side view of a charging unit/stand for the communications computer of FIG. 1.

For an independent power supply, one or more accumulators will be used and housed in the lower part of the camera housing 14. FIG. 5 shows a combination unit comprising a stand 26 and a battery charger 27. If the communications computer 1 is placed on the stand, electric contact is made between a pin 28 and a port 29 of the communications computer (FIG. 1) to charge the batteries while the computer 1 is in use.

Figure 4:
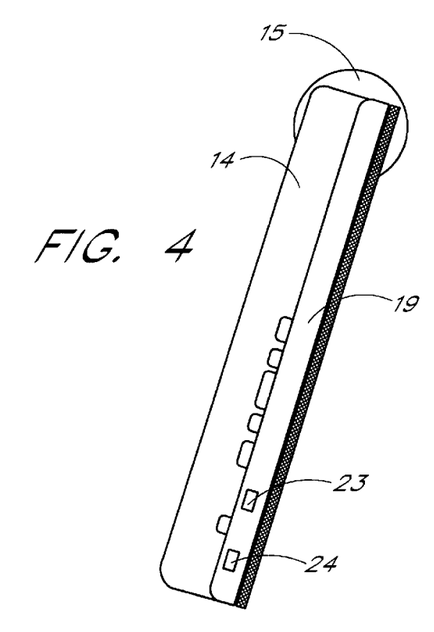
FIG. 4 is a right side view of the unit depicted in FIG. 1.

The stand 26 itself further contains two or more accumulators, which can be used as a spare power supply when the user travels and it is not possible to plug in the computer. The stand 26 provides a good position for the camera when the communication computer 1 is used as a mobile videophone. The stand 26 can be extended to incorporate photo lights in order to enhance the brightness of the user's face when the general lighting conditions are not suitable for video camera work. The stand 26 also provides an ergonomic and comfortable position for the communication computer 1 on the user's desktop and can serve as a permanent station, both for use and for charging the unit's batteries. The communications computer 1 is preferably tilted a little backwards on stand 26, as can be seen in FIG. 4. In combination, FIGS. 4 and 5 can be viewed as an exploded image of the communications computer 1 and the stand 26 together as a unit. The communications computer 1 does not require the stand 26 in order to be placed usefully on a desktop; it can stand upright alone when the two sides are moved inwards just a little to form an angle of approximately 150–160 degrees.

Figure 8:
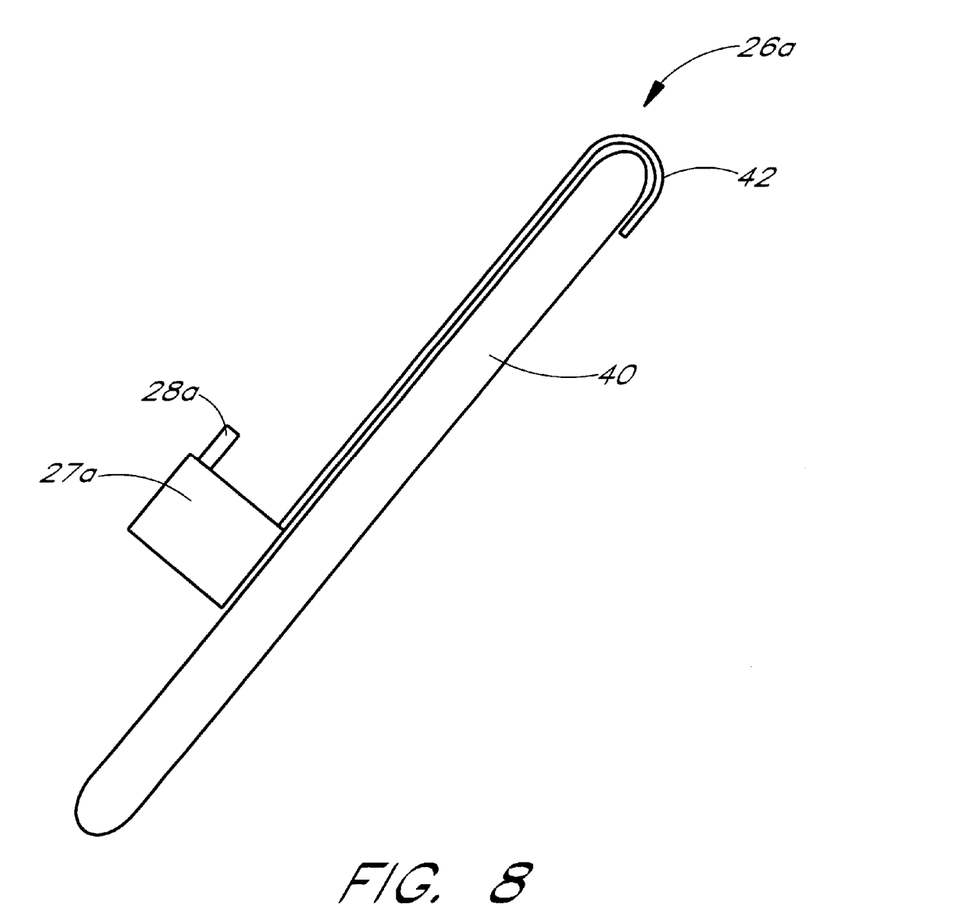
FIG. 8 is a schematic side view showing the communications computer in a stand adapted to attach to an automobile steering wheel.

With reference to FIG. 8, it is also possible to hold the device by a bracket 42 that is adapted to hook onto a steering wheel 42 of an automobile, to facilitate use of the device while on the road. Such a stand 28a is shown in FIG. 8. Such a stand 26a allows the user to take advantage of the placement of the steering wheel 40, which is generally at a height and attitude well-suited to conducting video communications in the manner described above. Of course, such a stand should be employed while the car is in a parked position. The stand 26a includes a battery charger 27a and electrode pin 28a for extending up into a socket of the video conference computer.

It will be appreciated by those skilled in the art that various modifications and changes may be made without departing from the scope of the invention. Such modifications and changes are intended to fall within the scope of the invention, as defined by the appended claims.

I claim:

1. A portable video conference computer comprising:

a computer unit having a monitor and an input mechanism comprising at least a first key group and a second key group, a mobile telephone unit having a monitor and an input mechanism comprising at least third key group and a fourth key group, and a digital camera, wherein the computer unit, mobile telephone unit, and digital camera are connected and networked with one another, the computer unit, mobile telephone unit, and digital camera being integrated with a portable housing, the portable housing comprising a book-like frame having a spine and two covers, wherein the computer unit is affixed inside one cover, the mobile telephone unit is affixed inside the other cover, and a housing of the digital camera is affixed inside the spine.

2. The portable video conference computer of claim 1, wherein the digital camera is provided within the housing so as to be rotatable about an axis.

3. The portable video conference computer of claim 2, wherein the axis of rotation of the camera is perpendicular to hinges between the spine and the covers.

4. The portable video conference computer of claim 1, wherein the computer unit is provided with at least a microprocessor, volatile memory, and non-volatile memory, the capacity of the volatile memory being greater than the capacity of the non-volatile memory.

5. The portable video conference computer of claim 1, wherein the first key group comprises an alphanumeric keyboard and the third key group comprises a numeric keypad.

6. The portable video conference computer of claim 5, wherein the fourth key group comprises keys controlling at least video and audio functions of the digital camera.

7. The portable video conference computer of claim 1, wherein the computer unit and the mobile telephone unit are each provided with a cursor control touch pad.

8. The portable video conference computer of claim 1, wherein the monitors and the input mechanisms are freely networkable and connectable.

9. The portable video conference computer of claim 1, wherein ports are provided for connection with external devices.

10. The portable video conference computer in accordance with claim 1, wherein wireless capability is provided for connection with external devices.

11. The portable video conference computer in accordance with claim 1, wherein the computer unit and the mobile telephone unit are connected with flexible printed circuitry.

12. The portable video conference computer in accordance with claim 1, wherein an accumulator capable of providing electric power is provided.

13. The portable video conference computer in accordance with claim 1, wherein a port is provided for connection with a power source.

14. The portable video conference computer in accordance with claim 13, wherein the power source is provided in a stand which serves to hold the communication computer is an opened configuration.

15. The portable video conference computer in accordance with claim 14, wherein the connection with the power source is carried out using:

the port and a pin on the stand.

16. The portable video conference computer in accordance with claim 1, wherein a switching signal displayed on both is monitors is provided for directing conversation during video communications.

17. The portable video conference computer in accordance with claim 1, wherein a wireless device is provided for signaling incoming calls.

18. A portable video conference computer comprising:

a computer unit having a monitor and an input mechanism comprising at least a first key group and a second key group, the first key group comprises an alphanumeric keyboard and the third key group comprises a numeric keypad, a mobile telephone unit having a monitor and an input mechanism comprising at least third key group and a fourth key group, and a digital camera, wherein the computer unit, mobile telephone unit, and digital camera are connected and networked with one another and both the fourth keys of the alphanumeric keyboard and the keys of the numeric keypad are recessed with respect to the surface of the computer unit and the mobile telephone unit.

19. The portable video conference computer of claim 18, wherein the second key group and the fourth key group comprise keys which are both raised with respect to the surface of the computer unit and the mobile telephone unit and are spaced to permit operation with a human finger.

* * * * *